United States Patent
Eavenson, Sr. et al.

(10) Patent No.: US 7,313,902 B1
(45) Date of Patent: Jan. 1, 2008

(54) FOLDING DECK MECHANISM

(75) Inventors: Jimmy N. Eavenson, Sr., Aurora, OH (US); Dennis O'Toole, Rocky River, OH (US); Jeff Mattern, Mantua, OH (US)

(73) Assignee: Commercial Turf Products, Ltd., Streetsboro, OH (US)

( * ) Notice: Subject to any disclaimer, the term of this patent is extended or adjusted under 35 U.S.C. 154(b) by 188 days.

(21) Appl. No.: 11/226,804

(22) Filed: Sep. 14, 2005

Related U.S. Application Data (60) Provisional application No. 60/708,627, filed on Aug. 16, 2005, provisional application No. 60/609,691, filed on Sep. 14, 2004.

(51) Int. Cl.
*A01D 34/00* (2006.01)

(52) U.S. Cl. ........................................ 56/13.6

(58) Field of Classification Search ............ 56/13.6, 56/385, 11.6, 6, 15.2, 320.1, 17.4; D15/15; 280/32.7
See application file for complete search history.

(56) References Cited

U.S. PATENT DOCUMENTS

| | | | | |
|---|---|---|---|---|
| 2,743,567 A * | 5/1956 | Martin | ............... | 56/6 |
| 2,920,434 A * | 1/1960 | Ingram | ............... | 56/10.6 |
| 2,952,961 A | 9/1960 | Engler | | |
| 3,116,583 A * | 1/1964 | Mason | ............... | 56/6 |
| 3,339,353 A * | 9/1967 | Schreyer | ............... | 56/6 |
| 3,369,350 A * | 2/1968 | Harlan et al. | ............... | 56/11.9 |
| 3,400,521 A | 9/1968 | Caldwell | | |
| 3,404,518 A * | 10/1968 | Kasper | ............... | 56/13.7 |
| 3,473,302 A * | 10/1969 | Caldwell | ............... | 56/6 |
| 3,500,619 A * | 3/1970 | Bacon | ............... | 56/6 |
| 3,714,992 A * | 2/1973 | Meier | ............... | 172/175 |
| 3,736,735 A * | 6/1973 | Kulak et al. | ............... | 56/13.6 |
| 4,308,713 A * | 1/1982 | James | ............... | 56/11.9 |
| 4,395,865 A | 8/1983 | Davis, Jr. et al. | | |
| 4,429,515 A | 2/1984 | Davis, Jr. et al. | | |
| 4,445,312 A * | 5/1984 | Cartner | ............... | 56/15.5 |
| 4,538,400 A * | 9/1985 | Hottes | ............... | 56/11.8 |
| 4,854,112 A | 8/1989 | Holley et al. | | |
| 4,858,417 A * | 8/1989 | Priefert et al. | ............... | 56/6 |
| 4,930,298 A * | 6/1990 | Zenner | ............... | 56/17.4 |
| 5,079,926 A | 1/1992 | Nicol | | |
| 5,113,640 A | 5/1992 | Colistro | | |
| 5,177,942 A | 1/1993 | Hager et al. | | |
| 5,233,817 A | 8/1993 | Nicol | | |
| 5,249,411 A * | 10/1993 | Hake | ............... | 56/11.6 |
| 5,280,695 A | 1/1994 | Nunes, Jr. et al. | | |
| 5,321,938 A | 6/1994 | LeBlanc | | |

(Continued)

*Primary Examiner*—Árpád Fábián Kovács
(74) *Attorney, Agent, or Firm*—Wegman, Hessler & Vanderburg (57) ABSTRACT

A lawn mowing machine having a mower deck with pivoting side wing sections. The pivoting side wing sections can be pivoted upward relative to the main deck housing. When the side wing sections are raised, the mowing machine is presented with a more narrow profile to pass through narrow width openings and to occupy less space during storage, transport and the like. The cutting blade spindles remain as fixed components of the main deck housing and do not pivot upward in conjunction with the side wing sections. When the side wing sections are raised, the cutting blades are adapted to pivot inwardly and underneath the main deck housing so that they do not protrude beyond the sides of the main deck housing. In this way, the mowing machine is adapted to pass through narrow width openings without the operator having to leave the operator station.

8 Claims, 7 Drawing Sheets

U.S. PATENT DOCUMENTS

| | | |
|---|---|---|
| 5,355,664 A | 10/1994 | Zenner |
| 5,463,853 A | 11/1995 | Santoli et al. |
| 5,483,787 A * | 1/1996 | Berrios ..................... 56/10.1 |
| 5,622,035 A | 4/1997 | Kondo et al. |
| 5,715,667 A | 2/1998 | Goman et al. |
| 5,927,055 A | 7/1999 | Ferree et al. |
| 6,000,202 A | 12/1999 | Laskowski |
| 6,308,503 B1 * | 10/2001 | Scag et al. ........................ 56/6 |
| 6,530,198 B2 * | 3/2003 | Bergsten et al. ............. 56/10.4 |
| 6,546,707 B2 * | 4/2003 | Degelman et al. ........... 56/15.2 |
| 6,647,705 B2 * | 11/2003 | Ewanochko et al. ......... 56/15.2 |
| 6,796,112 B1 * | 9/2004 | Price ............................... 56/6 |
| 7,185,479 B1 * | 3/2007 | Cartner ..................... 56/320.1 |

\* cited by examiner

FOLDING DECK MECHANISM

CROSS REFERENCE TO RELATED APPLICATIONS

This application claims the priority benefit of U.S. Provisional Patent Application Ser. No. 60/609,691 filed Sep. 14, 2004 and U.S. Provisional Patent Application Ser. No. 60/708,627 filed Aug. 16, 2005.

BACKGROUND OF THE INVENTION

1. Field of Invention

The present invention relates generally to the field of mower decks for riding or walk-behind lawn mowing machines, and more particularly relates to an improved sectional mower deck having pivotal side wing sections which can be raised upwardly so as to create a more narrow profile for the mowing machine.

2. Description of Related Art

Various types of lawn mowing machines having pivotal side wing sections have been developed. The current offerings of such mower decks are typically of the ground following type wherein the side wing sections can be selectively raised or removed to present a more narrow profile for passage through narrow width openings and for storage, transport, and the like. When the side wing sections are raised or removed, the cutting blades must be disengaged for safety purposes. Prior art mower decks having pivoting side wing sections typically incorporate cutting blade spindles which remain attached to the pivoting side wing sections when the side wing sections are raised. The drive arrangements and mounting mechanisms for cutting blade structures which pivot in conjunction with the side wing sections tend to be very complex, resulting in relatively high production, maintenance, and repair costs for such prior art machines. Another problem with prior art designs is that they have not been entirely satisfactory for use with zero-turn-radius (ZTR) mowing machines. This is because prior art mower decks having pivoting side wing sections typically function as ground following mower decks, wherein a set of castor wheels are mounted to the ground following mower deck to facilitate passage of the mower deck across the underlying ground surface. In ZTR applications, it is well known that the mowing machine is capable of making sharp turns around a zero-turning radius, with results being that the associated castor wheel arrangements must effectively pivot underneath the mower deck around 180 to 270 degrees to facilitate passage of the mower deck across the ground surface. Providing such castor wheel arrangements in a cost effective manner has been heretofore difficult to achieve.

Another problem with prior art mowing machines, especially those which incorporate removable or detachable pivoting side wing sections, is that the operator is typically required to leave the operator station to perform time consuming and labor intensive steps in order to remove the protruding side wing sections before the mowing machine is presented with a more narrow profile for passage through narrow width openings and the like.

Therefore, there remains a strong need for an improved sectional mower deck system having pivoting side wing sections and pivoting cutting blades, wherein the cutting blades remain as fixed components of the main deck housing, and wherein the mower deck functions as a rigid platform suitable for ZTR mower applications. Such a system provides advantage by minimizing the cost and complexity of the associated blade drive system and mower deck mounting structure, resulting in manufacturing cost advantage and superior operator convenience.

SUMMARY OF THE INVENTION

The present invention is characterized by a simple and cost effective system for providing a sectional mower deck which overcomes the aforementioned difficulties associated with the prior art. In accordance with the present invention, there is provided an improved mower deck having a main deck housing and at least one pivoting side wing section wherein the cutting blades remain as fixed components of the main deck housing. The mower deck is supported by the frame of the mowing machine, allowing the mower deck to function as a rigid platform capable of supporting accessory material collection systems, discharge chutes, or optional mulching capability. If desired, the pivoting side wing sections may be raised upwards, thereby presenting the mowing machine with a more narrow profile for passage through narrow width openings and to occupy less space during storage, transport and the like. The pivoting side wing sections can be raised upward by way of electric, hydraulic, or manual means, and can be operated remotely from the operator station of the mowing machine. For safety purposes, means are provided to prevent the cutting blades from rotating when the side wing sections are raised. In contrast to prior art designs wherein the blade spindles remain as fixed components of the pivoting side wing sections, the present invention provides a pivoting mower deck and cutting blade assembly wherein the blade spindles remain as fixed components of the main deck housing. Since the cutting blades remain substantially coplanar to the main deck housing when the side wing sections are raised, the cutting blades themselves are adapted to pivot freely about a hub axis of the blade spindles, thereby preventing the cutting blades from protruding beyond the side edges of the main deck housing when the side wing sections are raised. In this way, the cutting blades are capable of pivoting inwardly and underneath the main deck housing when the side wing sections are raised, allowing the mower to pass through narrow gateways and occupy less space during storage, transport and the like. When the side wing sections are raised, the cutting blades are disengaged and the mower may begin to traverse through the narrow width opening. If the cutting blades protrude beyond the sides of the main deck housing, frictional forces generated from the underlying grass and vegetation and/or forces applied when the disengaged cutting blades contact the physical mass of the threshold gateway opening will cause the cutting blades to pivot inwardly and underneath the main deck housing, thereby providing the necessary clearance for the mowing machine to pass through the narrow width opening without the operator having to leave the operator station. If the operator subsequently desires to operate the mowing machine with the cutting blades engaged, the side wing sections must be lowered to the horizontal position. Once the side wing sections are lowered and the cutting blades have been activated, centrifugal forces generated during blade rotation will cause the cutting blades to pivot outwardly into a fully extended cutting position, thereby allowing the cutting blades to cut a continuous swath under the entire mower deck structure, including the lowered pivoting side wing sections.

These and other features and advantages of the present invention will become apparent to one skilled in the art upon examination and analysis of the following detailed description and claims in view of the accompanying drawings.

DETAILED DESCRIPTION OF THE INVENTION

Figure 1A:
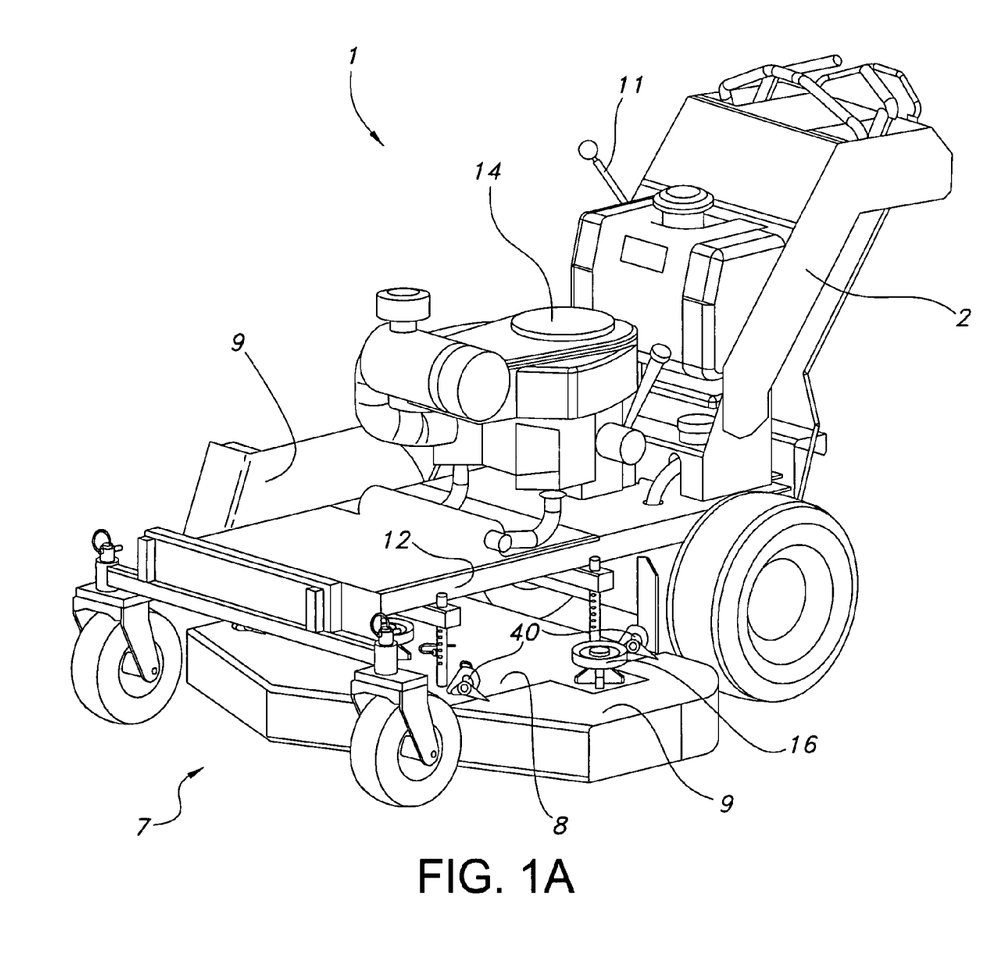
FIG. 1A is a perspective view of a walk behind mowing machine in accordance with the present invention.
Figure 1B:
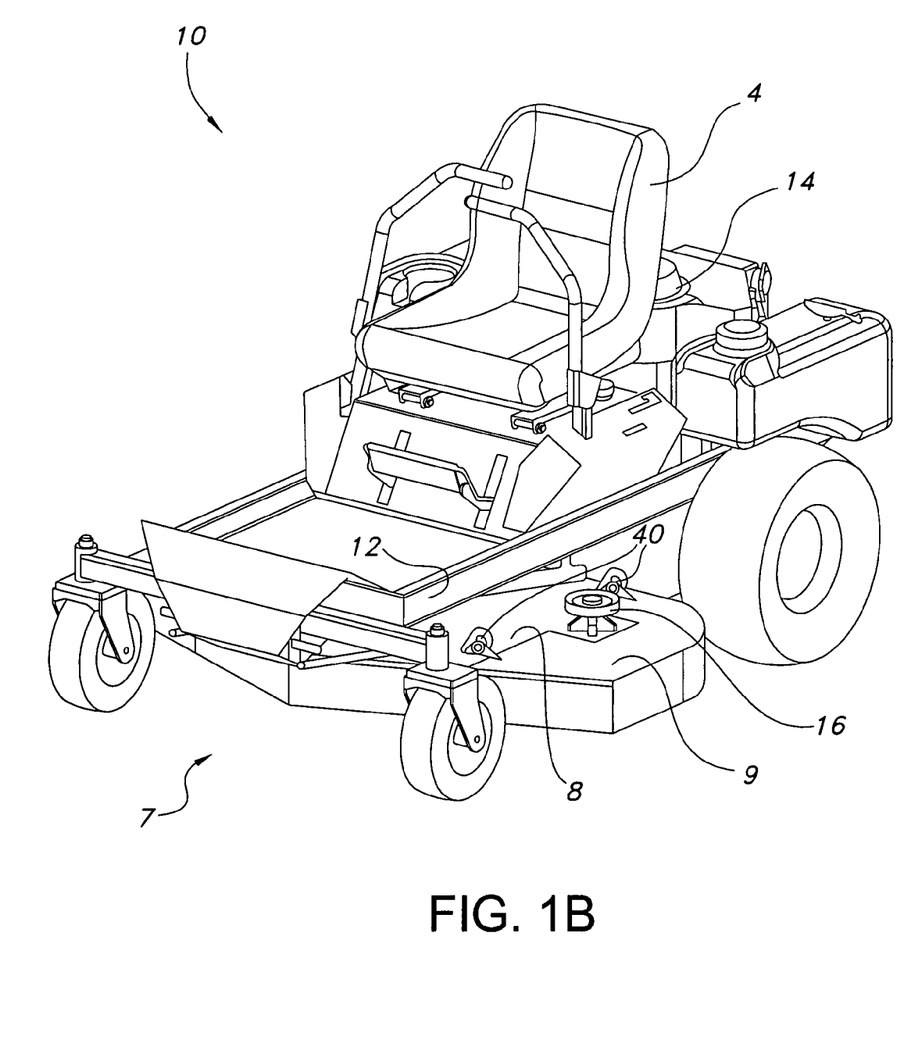
FIG. 1B is a perspective view of a riding type zero-turn radius (ZTR) mowing machine in accordance with the present invention.

With reference now to the drawings which illustrate the preferred embodiments of the invention, FIG. 1A shows an exemplary walk-behind lawn mowing machine 1 in accordance with one embodiment of the present invention. FIG. 1B shows an exemplary zero-turn radius (ZTR) mowing machine 10 in accordance with another embodiment of the present invention. The embodiments include a sectional mower deck 7 carried by a support frame 12. The mower deck 7 comprises a main deck housing 8 and a pair of pivoting side wing sections 9. The side wing sections are pivotally attached to opposite sides of the main deck housing, wherein the side wing sections are adapted to pivot upward relative to the main deck housing so as to present a more narrow profile for the mowing machine. A plurality of cutting blade spindles 16 are vertically mounted to the main deck housing 8, wherein the blade spindles are driven by an implement drive means such as an electric blade clutch (not shown) which transmits power from the engine 14 to drive the blade spindles 16 and associated cutting blades 18. The engine 14 comprises a controllable power-take-off (PTO) (not shown) for selectively engaging or disengaging power to the blade spindles 16. The support frame 12 supports a handle unit 2 as shown in FIG. 1A, or an operator seat 4 as shown in FIG. 1B. Each embodiment allows the operator to control operation of the mowing machine and pivoting side wing sections from the operator station as described in more detail below.

Figure 2:
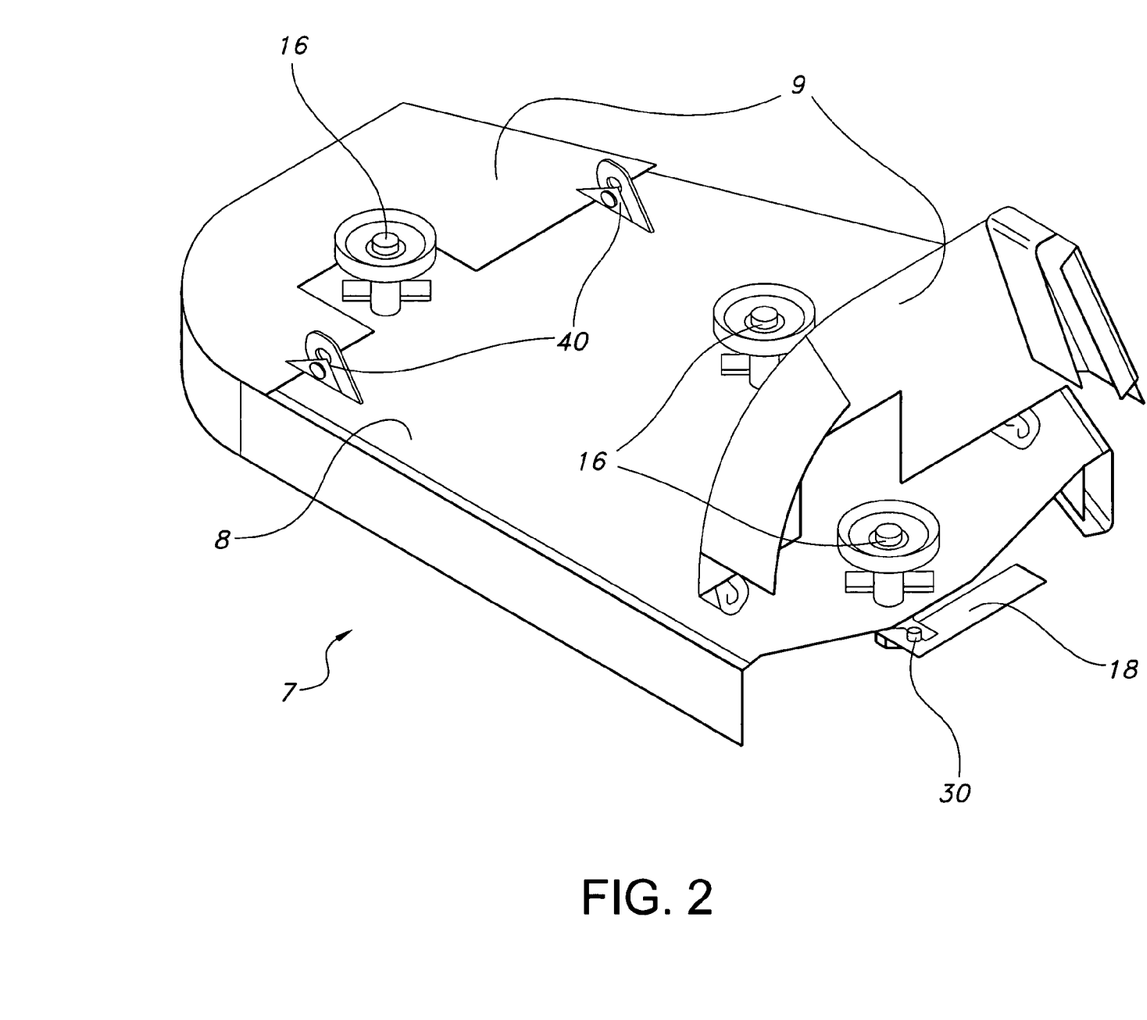
FIG. 2 is a perspective view of the mower deck with one side wing section fully raised and one cutting blade pivoted horizontally.
Figure 3:
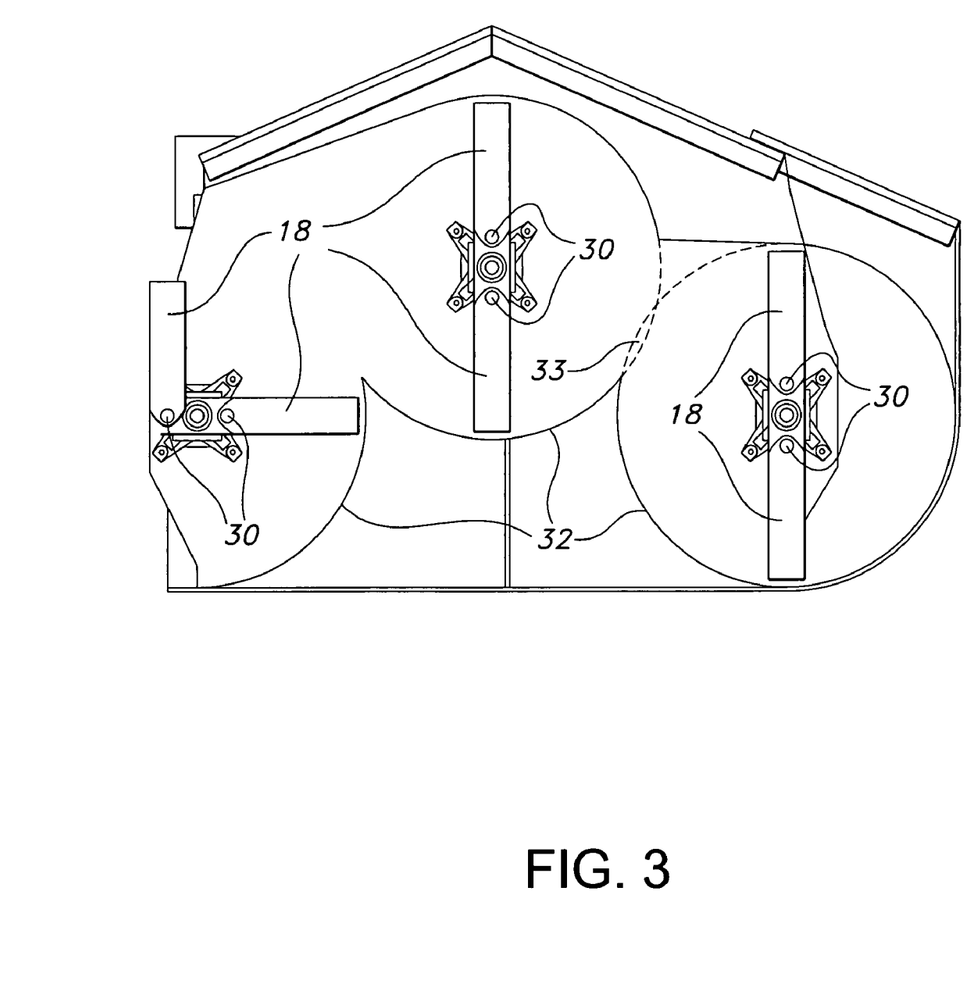
FIG. 3 is a bottom view of the mower deck with one side wing section fully raised and one cutting blade pivoted horizontally.

FIG. 2 shows, more specifically, the mower deck with one of the side wing sections 9 shown in the raised position. The side wing sections 9 are pivotally mounted on opposite sides of the main deck housing 8 by a set of pivoting latch structures 40, whereby the side wing sections may be swung vertically upwardly relative to the main deck housing. The main deck housing 8 is adapted to carry a plurality of vertical axis rotary blade spindles 16. The blade spindles 16 are connected in turn to an implement drive means such as an electric blade clutch (not shown) for transmitting power from the engine 14 to drive the blade spindles and associated cutting blades 18. As best shown in FIG. 3, the blade spindles are strategically positioned relative to the main deck housing so that the circumferential cutting path radius 32 defined by the rotating cutting blades are configured to overlap slightly front-to-back and side-to-side as generally shown at 33, allowing the mower to cut a continuous swath without gaps below the main deck housing and pivoting side wing sections. In this way, there is no intermeshing of the cutter blades, thereby eliminating the necessity for complicated timing means to synchronize rotation of the several cutting blades.

The cutting blades 18 are attached to spindle hubs 30 which in turn are mounted to the blade spindles by means known in the art so that the blades 18 can pivot freely on the hubs 30. The hubs 30 in turn are mounted onto an end of the blade spindles 16, allowing the cutting blades to rotate within the mower deck enclosure.

As shown in FIG. 3, the mounting hub 30 is attached to an axis of each blade spindle 16, and a set of cutting blades 18 are pivotally mounted to the mounting hub 30, thereby allowing the cutting blades 18 to pivot freely on the hub 30. In one exemplary embodiment of the present embodiment, the mower deck comprises a pair of pivoting side wing sections 9, wherein the side wing sections 9 are pivotally attached by way of pivoting latch structures 40 onto opposite sides of the main deck housing 8, respectively. It is understood that more or less side wing sections may be employed without departing from the scope of the present invention.

The cutting blades 18 are capable of pivoting underneath the main deck housing 8 when the side wing sections 9 are raised, providing the necessary clearance for the mower to pass through narrow gateways and to occupy less space during storage, transport and the like. As discussed in more detail below, a cut-out means is provided to prevent the cutting blades 18 from rotating when the side wing sections 9 are raised. When the side wing sections 9 are raised and the cutting blades stop rotating, frictional forces generated from the underlying grass and vegetation and/or forces applied to the disengaged cutting blades from the physical mass of the threshold i.e. gateway opening will cause the cutting blades to pivot inward, thereby providing the necessary clearance for the mower to pass through the narrow width opening without the operator having to leave the operator station. If the operator subsequently desires to operate the mowing machine with the cutting blades engaged, the side wing sections 9 must be pivoted downward to the lowered position. Once the side wing sections are lowered and the cutting blades have been activated, centrifugal forces generated during blade rotation will cause the cutting blades to pivot outwardly about the hub axis 30 into a fully extended cutting position, thereby allowing the cutting blades 16 to cut a full overlapping cutting radius 32, with results being that the mower cuts a continuous swath under the entire mower deck, including the lowered pivoting side wing sections.

Figure 4:
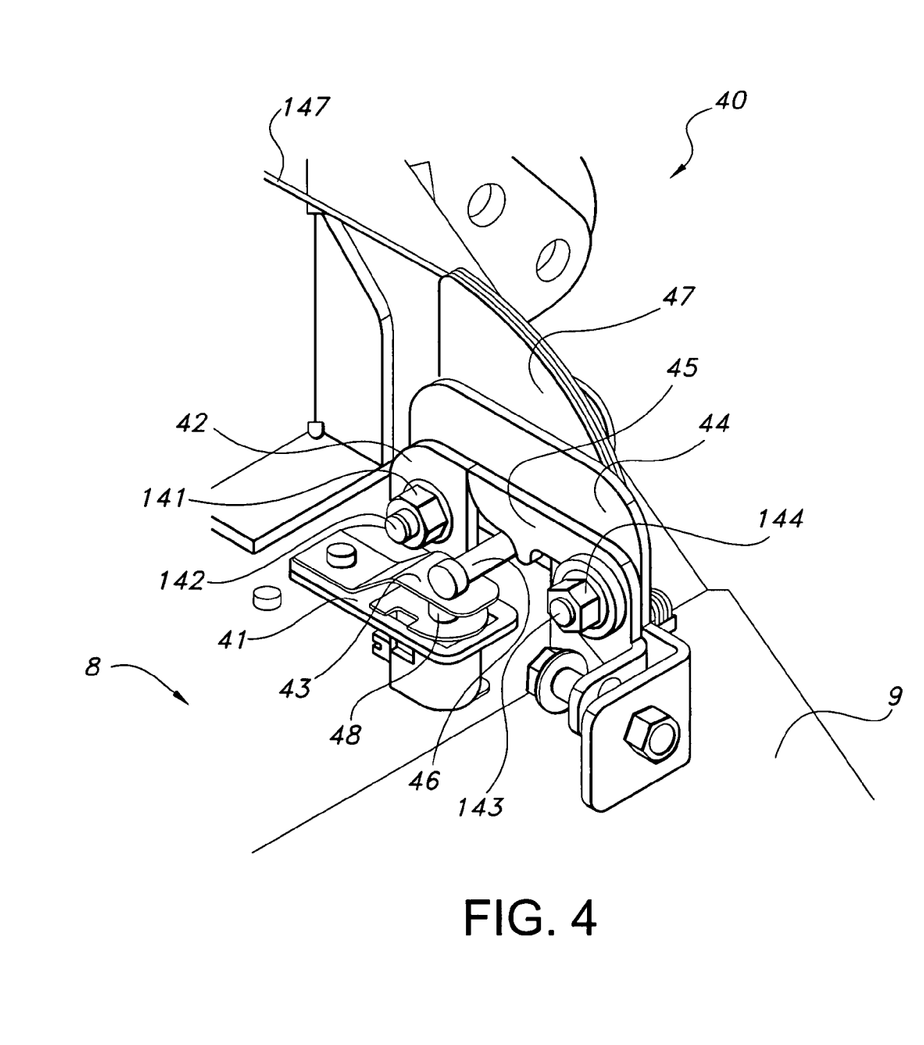
FIG. 4 is a detail of a means for pivoting the side wing sections in accordance with an exemplary embodiment of the present invention, wherein one side wing section is illustrated in the lowered position.
Figure 5:
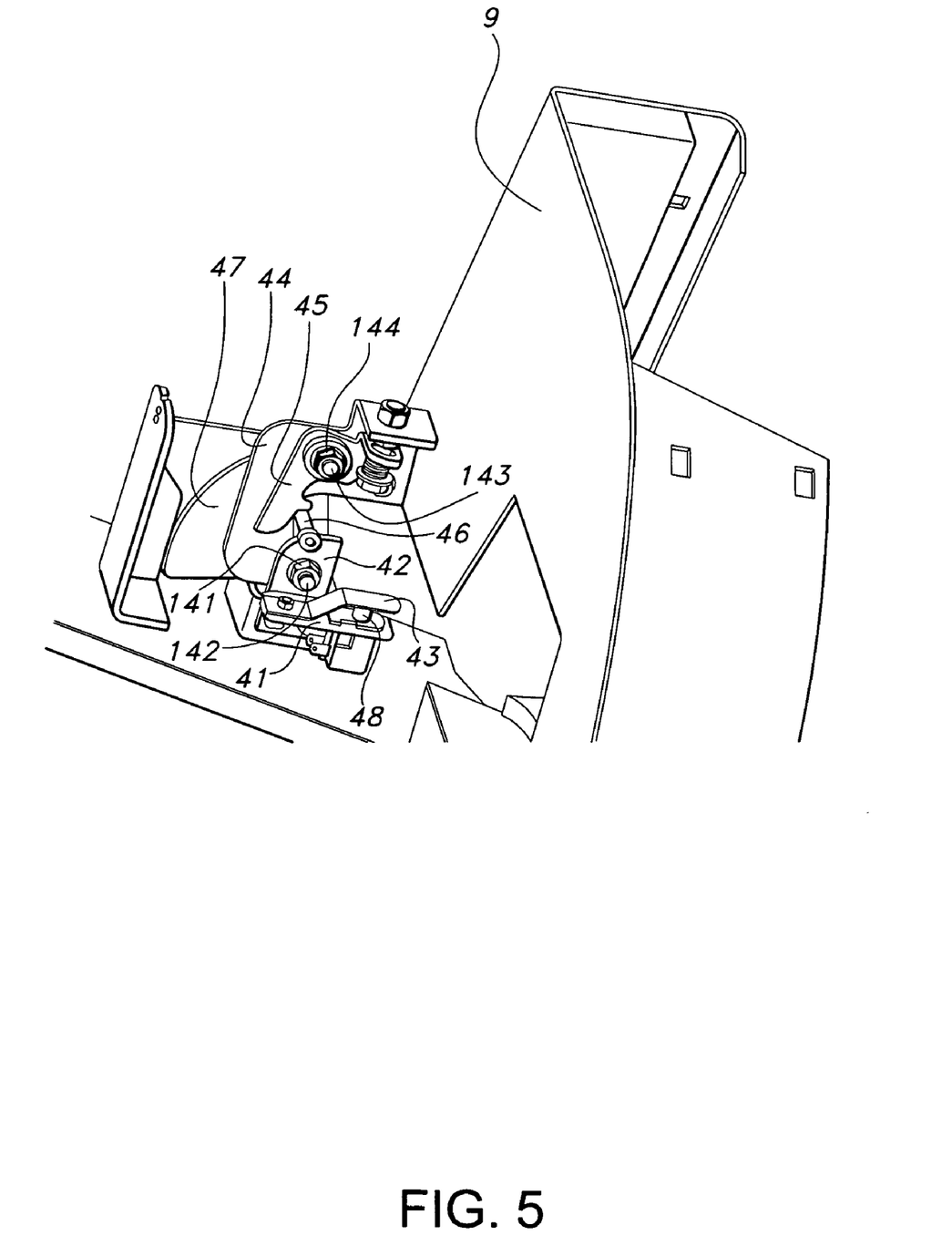
FIG. 5 is a detail of a means for pivoting the side wing sections in as shown in FIG. 4, wherein one side wing section is illustrated in the raised position.

With reference to FIGS. 4 and 5, the operation of an exemplary embodiment for providing reciprocal pivoting movement of the side wing sections 9 will now be described. In one exemplary embodiment, the pivoting latching structure 40 includes a latching plate 45 pivotally mounted to the pivot plate 44 by way of nut 143 and bolt 144. A reciprocating cable 147 is operatively associated with an arcuate portion of a pivoting cam plate 47. The cam plate 47 is connected to an end of an associated pivot plate 44, which in turn is pivotally mounted to the pivot weldment 42 by way of bolt 142 and nut 141. The other end of the pivot plate 44 is fixedly mounted to a top surface of the pivoting side wing section 9. A cable drive means, for example a manually actuated push/pull lever 11 (FIG. 1A) may be employed to drive the reciprocating cable 147. It is understood that many different types of cable drive means, such as hydraulic linear actuator cylinders or other electric drive means, may be employed in a manner known in the art to drive the reciprocating cable 147 and achieve the same results. Moreover, as described below with reference to FIG. 6, a single hydraulic linear actuator cylinder may be used to effect the desired reciprocal pivoting movement of the side wing sections 9 without the necessity of implementing a flexible reciprocating cable 147.

As best shown in FIGS. 4 and 5, the pivot weldment 42 is connected to a top surface of the main deck housing 8 proximate the side wing section 9. One end of the generally U-shaped pivot plate 44 is pivotally mounted to a rigid upright portion of the pivot weldment 42 by means of nut 141 and bolt 142, allowing pivot plate 44 to pivot upwards with respect to pivot weldment 42 about a longitudinal axis of bolt 142. The other end of the pivot plate 44 is fixedly mounted to a top surface of the side wing section 9, allowing the pivot plate to pivot about a longitudinal axis of bolt 142, thereby providing a hinge axis for pivoting the side wing section upward and perpendicular to the horizontal plane defined by the main deck housing as best shown in FIG. 5.

When the operator activates the push/pull lever 11 (FIG. 1A), a tension force is applied to the reciprocating cable 147, causing the arcuate pivoting cam plate 47 to pivot upward, which in turn causes the associated pivot plate 44 to pivot upward about a longitudinal axis of bolt 142, thereby effecting upward pivotal movement to the attached side wing section 9 relative to main deck housing 8 and allowing the side wing section 9 to be raised substantially perpendicular to the main deck housing 8 as shown in FIG. 5. In order to lower the side wing sections, the operator disengages the push/pull lever 11 which in turn releases the tension force of the reciprocating cable 147. When the tension force of the reciprocating cable is released, the pivoting action of the latching structure 40 is reversed, allowing the pivoting side wing section 9 to pivot downward relative to the main deck housing 8 as shown in FIG. 4.

Referring again to FIG. 4, one end of the latching plate 45 is configured in shape and size to engage an inside surface of the pivot weldment 42 above the engagement pin 46, and the other end of the latching plate is mounted to the pivot plate 44 proximate the top surface of the side wing section 9. When the side wing section is in the lowered position of FIG. 4, the engagement pin 46 and horizontal mounting bracket 41 provide a positive stop for the latching plate so as to prevent the side wing section 9 from inadvertently pivoting upward when the pivoting latching structure 40 has not been activated. In this way, the latching plate 45 effectively locks the side wing sections in the lowered position, allowing the mower deck to function as a rigid platform capable of supporting a variety of accessory material collection systems, discharge chutes, or optional mulching capability (not shown). When the operator subsequently activates the pivoting latching structure 40 to raise the side wing sections 9, the associated latching plate 45 pivots above and out of the way of the horizontal mounting bracket 41, allowing the cam plate 47 and associated pivot plate 44 to raise the side wing sections 9 upward relative to the main deck housing 8 as described above.

As shown in FIGS. 4 and 5, the pivoting latching structure 40 further comprises a cut-out means comprising a set of normally open cut-out switches 48 mounted to a top surface of the main deck housing 8 proximate the horizontal mounting bracket 41 to prevent the cutting blades from rotating when the side wing sections 9 are raised. In the exemplary embodiments described herein, normally open cut-out switches 48 are actuated when the side wing sections 9 are lowered by the action of the engagement pin 46 carried by the pivoting cam plate 47, with results being that power to the cutting blades is terminated when the side wing sections 9 are raised, and is restored when the side wing sections 9 are lowered. A leaf spring 43 is attached to the horizontal mounting bracket 41 so as to effect biasing contact with the depressible cut-out switch 48 when the engagement pin 46 is lowered. The engagement pin 46 is carried by the pivoting cam plate 47 so that when the side wing section 9 is lowered into the horizontal position (as shown in FIG. 4), engagement pin 46 engages the leaf spring 43 so as to activate (i.e. close) cut-out switch 48. In this way, assuming the PTO is activated, electrical connection is made between the PTO and blade spindles 16, thereby activating the blade spindles and causing the cutting blades 18 to rotate. It is noted that the details required for providing the necessary electrical connections for operating the power cut-out means for the cutting blades is within the skill in the art, not requiring undue experimentation, and will not be discussed further in detail herein.

When the side wing sections 9 are pivoted upward into the raised position of FIG. 5, the engagement pin 46 is raised from leaf spring 43 causing the cut-out switch 48 to become disengaged. When cut-out switch 48 is disengaged, power to the blade spindles 16 is interrupted, thereby preventing operation of the cutting blades.

Figure 6:
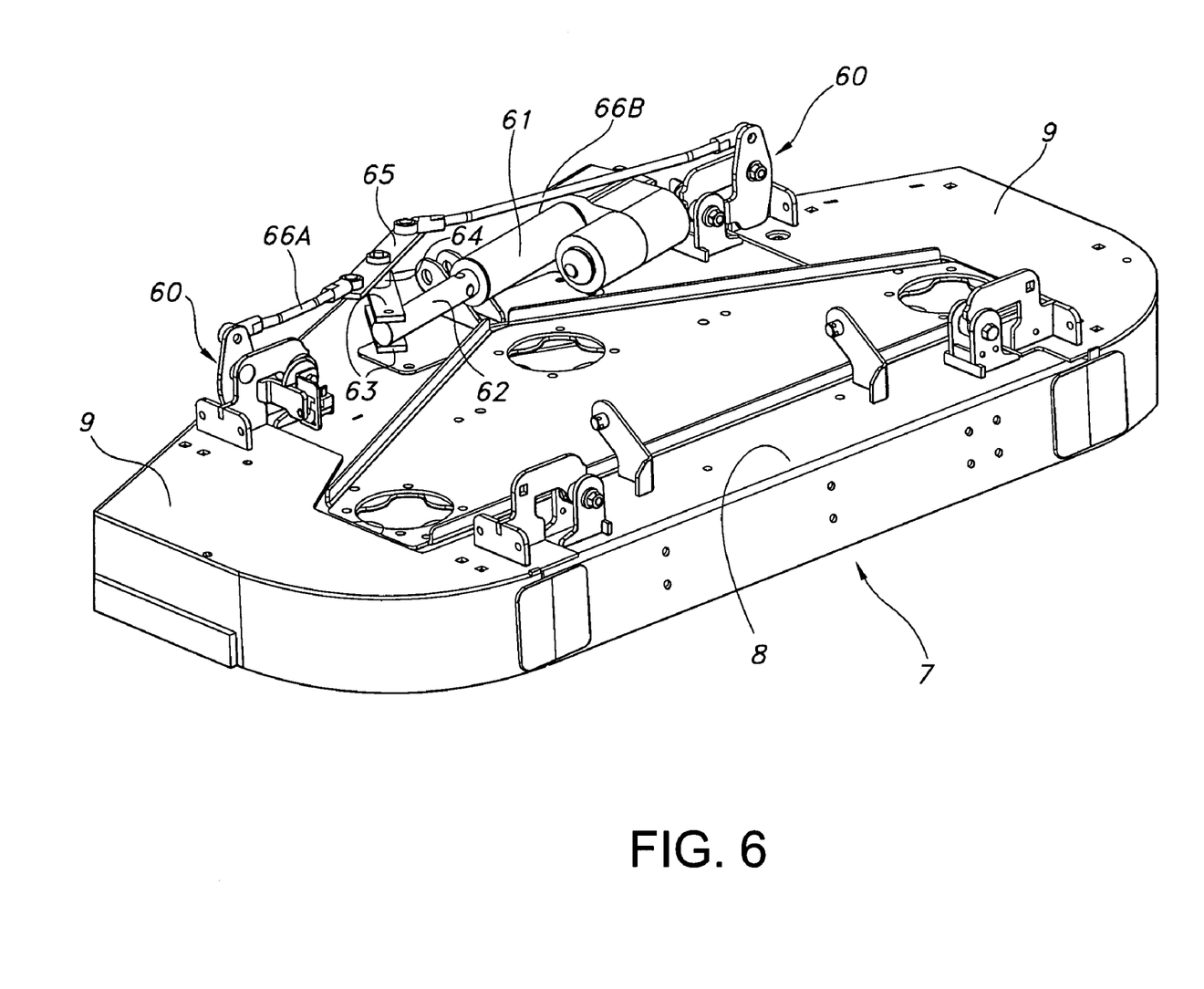
FIG. 6 is a perspective view a means for pivoting the side wing sections in accordance with another exemplary embodiment of the present invention.

FIG. 6 illustrates another exemplary embodiment for providing reciprocal pivoting movement of the side wing sections 9 of the mower deck 7. Here, a hydraulic linear actuator cylinder 61 is mounted to the top surface of the mower deck housing 8. The cylinder 61 comprises an actuator piston rod 62 connected to one end of a pair of actuator brackets 63. The distal ends of the brackets 63 are adapted to rotatably drive a cylindrical axis member 64 about its longitudinal axis. The axis member 64 is operatively coupled to a perpendicular bracket member 65, which in turn is operatively connected to an associated set of push/pull rods 66A, 66B, which in turn are adapted to drive the pivoting latch structures generally represented by the reference number 60.

In operation, when the hydraulic cylinder 61 is actuated by the machine operator, the linear movement of the piston rod 62 actuates the actuation brackets 63, which in turn causes the associated axis member 64 and bracket member 65 to rotate about the longitudinal axis of the axis member 64. The rotational movement of the bracket member 65 in turn drives the push/pull rods 66A, 66B so as to actuate the associated latch structures 60, with results being that the side wing sections 9 are caused to pivot upward with respect to the mower deck housing 8. At the same time, once the side wing sections 9 begin to pivot upwards, cut-out switches (as shown by reference number 48 in FIGS. 4, 5) are released, with results being that power to the cutting blades is effectively terminated.

When it is desired to pivot the side wing sections 9 downward to the lowered position, the operator simply deactivates the hydraulic cylinder 61, with results being that the above described process is reversed. When the side wing sections are locked in the lowered position and the cut-out switches 48 have been engaged, the cutting blades are permitted to operate normally. Once the cutting blades are activated, centrifugal forces from blade rotation will cause the cutting blades to pivot outwardly into their fully extended cutting position underneath the lowered side wing sections 9.

The use of a single linear actuator cylinder 61 to effect reciprocal pivoting movement of the side wing sections 9 is advantageous in that the cylinder 61 may be attached directly to the top surface of the mower deck, thereby allowing the mower deck to be completely assembled independent from the rest of the mowing machine. Once assembled, the complete mower deck can then be installed as a single component underneath the mowing machine. The embodiment of FIG. 6 is also advantageous in that it provides a lower center of gravity for the mower deck assembly, and eliminates the necessity of providing a flexible reciprocating cable means to actuate the side wing sections, thus eliminating the need to independently size and measure the cables at assembly, and eliminating subsequent maintenance procedures associated with wear, tear, and stretching of the flexible cables. Those skilled in the art will also appreciate that the embodiment of FIG. 6 significantly simplifies the construction of the associated latching structure 60, thus further reducing the costs of manufacturing and assembling the overall mower deck assembly.

As described herein, the machine operator may actuate the pivoting side wing sections 9 from the operator station by selectively actuating a manual push/pull lever 11 to drive an associated reciprocating cable 147 as shown in FIGS. 4, 5, or the operator may activate a single linear actuator cylinder 61 from the operator station to selectively raise or lower the pivoting side wing sections 9 as shown in FIG. 6. Those skilled in the art will appreciate that many other known or later developed means may be used to effect the desired reciprocal pivoting movement of the side wing sections 9 without departing from the scope and spirit of the present invention. In any case, so long as the mower is running and the side wing sections 9 are positioned in the lowered position, the operator may selectively activate the cutting blades 18 by simply engaging the vehicle's PTO system (not shown). If the operator subsequently desires to drive the mowing machine through a narrow gateway or the like, the operator would then activate the pivoting means from the operator station to raise the side wing sections 9. When the side wing sections start to pivot upward, the engagement pin 46 releases the associated cut-out switches 48, thereby interrupting power to the cutting blades and preventing the cutting blades from rotating. As the cutting blades coast to a stop, the pivoting side wing sections continue to pivot upward. By the time the pivoting side wing sections have been fully raised, the cutting blades will have come to a stop, thereby allowing the mower to traverse the narrow width opening without the cutting blades rotating. If once the cutting blades have stopped rotating and the cutting blades protrude beyond the sides of the main deck housing, frictional forces generated from the underlying grass and vegetation and/or forces applied when the disengaged cutting blades contact the physical mass of the threshold i.e. gateway opening cause the cutting blades to pivot inwardly and underneath the main deck housing, thereby providing the necessary clearance for the mowing machine to pass through the narrow width opening without the operator having to leave the operator station.

Once the mower has passed through the narrow width opening, the operator may then lower the side wing sections 9 as described above and continue operation of the mowing machine with the cutting blades engaged if desired. Once the side wing sections are locked in the lowered position and the cut-out switches 48 have been actuated, the cutting blades will start rotating, and centrifugal forces from blade rotation will cause the cutting blades to pivot outwardly into their fully extended cutting position.

From the foregoing, those skilled in the art will appreciate that connections between the various components of the pivoting means may be made by different combinations of nuts, bolts, and washers as described above and generally shown, or may be made by other known or later developed connection structures suitable to effect the necessary motions required in this system. It is also understood that many different types of cable drive means, such as hydraulic linear actuator cylinders or other electric drive means, may be employed to drive the reciprocating cable 147, or that a single linear actuator cylinder may be implemented to effect the required reciprocal pivoting action to achieve the same results.

One significant advantage of the present invention is the unique mower deck design wherein the cutting blades remain as fixed components of the main deck housing. Another advantage is provided by the pivoting cutting blades which are allowed to pivot underneath the main deck housing when the side wing sections are raised. Other advantages will be evident to those skilled in the art. It is to be understood that the form of the invention herewith shown and described is to be taken as a preferred embodiment of the same, and that various changes in the shape, size, and arrangement of parts may be resorted to, without departing from the spirit and scope of the invention as defined in the following claims.

What is claimed is:

1. A mower deck for a lawn mowing machine, said mower deck comprising:

a main deck housing;

at least one side wing section pivotally attached to a side of said main deck housing, said mower deck defining a lowered position when said side wing section is positioned substantially coplanar to said main deck housing, and a raised position when said side wing section is positioned substantially perpendicular to said main deck housing;

pivoting means for effecting pivotal movement of said side wing section between said lowered position and said raised position, wherein said pivoting means is operable remotely from an operator station of said lawn mowing machine;

wing section latching structure comprising a pivot plate fixedly mounted to said side wing section and pivotally mounted to the main deck housing and a latching plate pivotally mounted on said pivot plate, said pivot plate being movable by said pivoting means between a lowered position and a raised position thereby providing a hinge axis for pivoting said side wing section, wherein when the pivot plate is in the lowered position, said latching plate prevents the side wing section from pivoting to the raised position;

a switch sensing the position of the wing section latching structure; and a plurality of blade spindles mounted to said main deck housing, each said blade spindle being adapted to receive at least one cutting blade for rotation about a spindle axis underneath said main deck housing, said blade spindles being operable for rotation when said switch senses that the wing section latching structure is in its lowered position, and said blade spindles being inoperable for rotation when said switch senses that the wing section latching structure is not in the lowered position.

2. The mower deck as recited in claim 1, wherein said pivoting means is driven by a reciprocating cable.

3. The mower deck as recited in claim 2, wherein said reciprocating cable is driven by manual, electric, or hydraulic power means.

4. The mower deck as recited in claim 1, wherein said pivoting means comprises a linear actuator cylinder and does not comprise a reciprocating cable.

5. The mower deck as recited in claim 1 wherein said blade spindles are spaced apart relative to said main deck housing such that at least one said cutting blade is adapted to rotate underneath said side wing section when said side wing section is in said lowered position;
   wherein each said cutting blade adapted to rotate underneath said side wing section is a pivoting cutting blade, each said pivoting cutting blade having a hub axis for allowing each said pivoting cutting blade to pivot inwardly underneath said main deck housing about said hub axis when said side wing section is in said raised position; and
   means for selectively effecting rotational movement of said cutting blades such that a centrifugal force generated by blade rotation causes each said pivoting cutting blade to pivot outwardly about said hub axis, thereby allowing each said pivoting cutting blade to rotate underneath said side wing section when said side wing section is in said lowered position.

6. The mower deck as recited in claim 1, wherein the wing section latching structure further comprises an engagement pin and a leaf spring, wherein when the side wing section is in the lowered position, the engagement pin causes the leaf spring to contact the switch.

7. The mower deck as recited in claim 6, wherein the latching plate engages the engagement pin when the pivot plate is in its lowered position.

8. The mower deck as recited in claim 6, further comprising a mounting bracket on said main deck housing, wherein when the pivoting means has not raised the side wing section from its lowered position, the engagement pin and mounting bracket provide a positive stop for the latching plate so as to prevent the side wing section from pivoting upward such that the latching plate locks the side wing section in its lowered position, and when the pivoting means is actuated to raise the side wing section, pivoting of the pivot plate causes the latching plate to pivot out of the way of the mounting bracket, allowing the pivot plate to raise the side wing section relative to the main deck housing.

* * * * *